(12) United States Patent
Lee (10) Patent No.: US 12,113,365 B2
(45) Date of Patent: Oct. 8, 2024

(54) WIRELESS CHARGER WITH MAGNETIC LOCATING FUNCTION

(71) Applicant: Cheng Uei Precision Industry Co., Ltd., New Taipei (TW)

(72) Inventor: James Cheng Lee, La Habra, CA (US)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 504 days.

(21) Appl. No.: 17/507,840

(22) Filed: Oct. 22, 2021

(65) Prior Publication Data

US 2023/0125535 A1    Apr. 27, 2023

(51) Int. Cl.
*H02J 50/00* (2016.01)
*H02J 50/10* (2016.01)
*H02J 50/90* (2016.01)

(52) U.S. Cl.
CPC ............ *H02J 50/005* (2020.01); *H02J 50/10* (2016.02); *H02J 50/90* (2016.02)

(58) Field of Classification Search
CPC ........... H02J 50/10; H02J 50/12; H02J 50/005
See application file for complete search history.

(56) References Cited

U.S. PATENT DOCUMENTS

2022/0042643 A1 *   2/2022   Rasmussen ........... H02J 7/0042

FOREIGN PATENT DOCUMENTS

DE      202013005246 U1 *  10/2013  ............ H02J 7/0042
WO   WO-2010017416 A1 *   2/2010  ............ H02J 7/0044

* cited by examiner

*Primary Examiner* — David V Henze-Gongola
(74) *Attorney, Agent, or Firm* — Lin & Associates Intellectual Property, Inc.

(57) ABSTRACT

A wireless charger with magnetic locating function includes an insulating body, a circuit module, a plug module and a wireless charging module. A front of the insulating body is recessed inward to form an opening, and the opening is further recessed inward to form an accommodating space. The circuit module is mounted in the accommodating space. The plug module is connected with the circuit module. The wireless charging module is mounted to the insulating body. The wireless charging module includes a magnetic core equipped with a charging coil, a bracket and an outer board. The charging coil is connected to the circuit module. The bracket covers the charging coil. The bracket has a plurality of accommodating grooves, and each accommodating groove is equipped with one magnetic element. The outer board covers the bracket.

10 Claims, 11 Drawing Sheets

WIRELESS CHARGER WITH MAGNETIC LOCATING FUNCTION

BACKGROUND OF THE INVENTION

1. Field of the Invention

The present invention generally relates to a wireless charger, and more particularly to a wireless charger with magnetic locating function.

2. The Related Art

Currently, a charging unit is connected with an external charging cable. The external charging cable is connected to a power supply. The charging unit is connected to the power supply by the external charging cable, so that the charging unit proceeds with a charging function. However, when a user uses the above-mentioned charging unit to proceed with the charging function, the user needs to carry the external charging cable and the power supply. If the user lacks one of the external charging cable and the power supply, the user has no way of proceeding with the charging function.

Moreover, if the charging unit is a wireless charger, and the user uses the wireless charger to charge a smart phone, the user needs to align the smart phone to the wireless charger. When the smart phone cannot be aligned with a charging module in the wireless charger, in consequence, the wireless charger is unable to charge the smart phone.

Therefore, it is necessary to provide a wireless charger with magnetic locating function, so that the user may conveniently use the wireless charger with magnetic locating function to locate an electronic device and charge the electronic device.

SUMMARY OF THE INVENTION

An object of the present invention is to provide a wireless charger with magnetic locating function. The wireless charger with magnetic locating function includes an insulating body, a circuit module, a plug module and a wireless charging module. A front of the insulating body is recessed inward to form an opening, and the opening is further recessed inward to form an accommodating space. The circuit module is mounted in the accommodating space. The plug module is mounted to a rear of the circuit module, and the plug module is connected with the circuit module. The plug module projects out of the insulating body from a rear end of the accommodating space. The wireless charging module is mounted to the opening of the insulating body. The wireless charging module slantwise extends frontward and downward from a top of the insulating body to a bottom of the insulating body. The wireless charging module includes a magnetic core, a charging coil, a bracket, a plurality of magnetic elements and an outer board. The magnetic core is equipped with the charging coil. The charging coil is connected to the circuit module. The bracket covers the charging coil. A periphery of a front of the bracket has a plurality of accommodating grooves, and each accommodating groove is equipped with one magnetic element. The outer board covers the bracket.

Another object of the present invention is to provide a wireless charger with magnetic locating function. The wireless charger with magnetic locating function includes an insulating body, a circuit module, a plug module, a wireless charging module and a cover. A front of the insulating body forms an opening. The insulating body has an accommodating space which is formed inside the insulating body and is communicated with the opening. A periphery of the opening is inclined frontward and downward from a top of the insulating body to a bottom of the insulating body. The circuit module is mounted in the accommodating space. The plug module is mounted to a rear of the circuit module, and the plug module is connected with the circuit module. The plug module projects out of a rear of the insulating body. The wireless charging module is mounted to the opening of the insulating body. The wireless charging module includes a magnetic core, a charging coil, a bracket, a plurality of magnetic elements and an outer board. The magnetic core is equipped with the charging coil. The charging coil is connected to the circuit module. The bracket covers the charging coil. A periphery of a front of the bracket has a plurality of accommodating grooves, and each accommodating groove is equipped with one magnetic element. The outer board covers the bracket. The wireless charging module slantwise extends frontward and downward from the top of the insulating body to the bottom of the insulating body. The cover is assembled between the wireless charging module and the accommodating space.

Another object of the present invention is to provide a wireless charger with magnetic locating function. The wireless charger with magnetic locating function includes an insulating body, a first circuit board, a second circuit board, a plug module and a wireless charging module. A front of the insulating body forms an opening. The insulating body has an upper accommodating space and a lower accommodating space which are formed inside the insulating body and are communicated with the opening. The first circuit board is disposed in the upper accommodating space. The first circuit board has a socket connector. The socket connector is exposed out of the insulating body. The second circuit board is disposed in the lower accommodating space. The second circuit board is connected to the first circuit board. The plug module is mounted to a rear of the insulating body. The plug module is connected with the second circuit board. The plug module projects out of the rear of the insulating body. The wireless charging module is mounted to the opening. The wireless charging module includes a magnetic core, a charging coil, a bracket, a plurality of magnetic elements and an outer board. The magnetic core is equipped with the charging coil. The charging coil is connected to the second circuit board. The bracket covers the charging coil. Each magnetic element is mounted to the bracket. The outer board covers the bracket.

As described above, the wireless charger with magnetic locating function integrates the plug module with the wireless charging module, so the wireless charger with magnetic locating function realizes a wireless charging function. A smart phone or an electronic device with a wireless charging function is located on the wireless charging module by the plurality of the magnetic elements, so that the smart phone or the electronic device on the wireless charging module is aligned with the charging coil. As a result, it is convenient for a user to wirelessly charge the smart phone or the electronic device with the wireless charging function.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
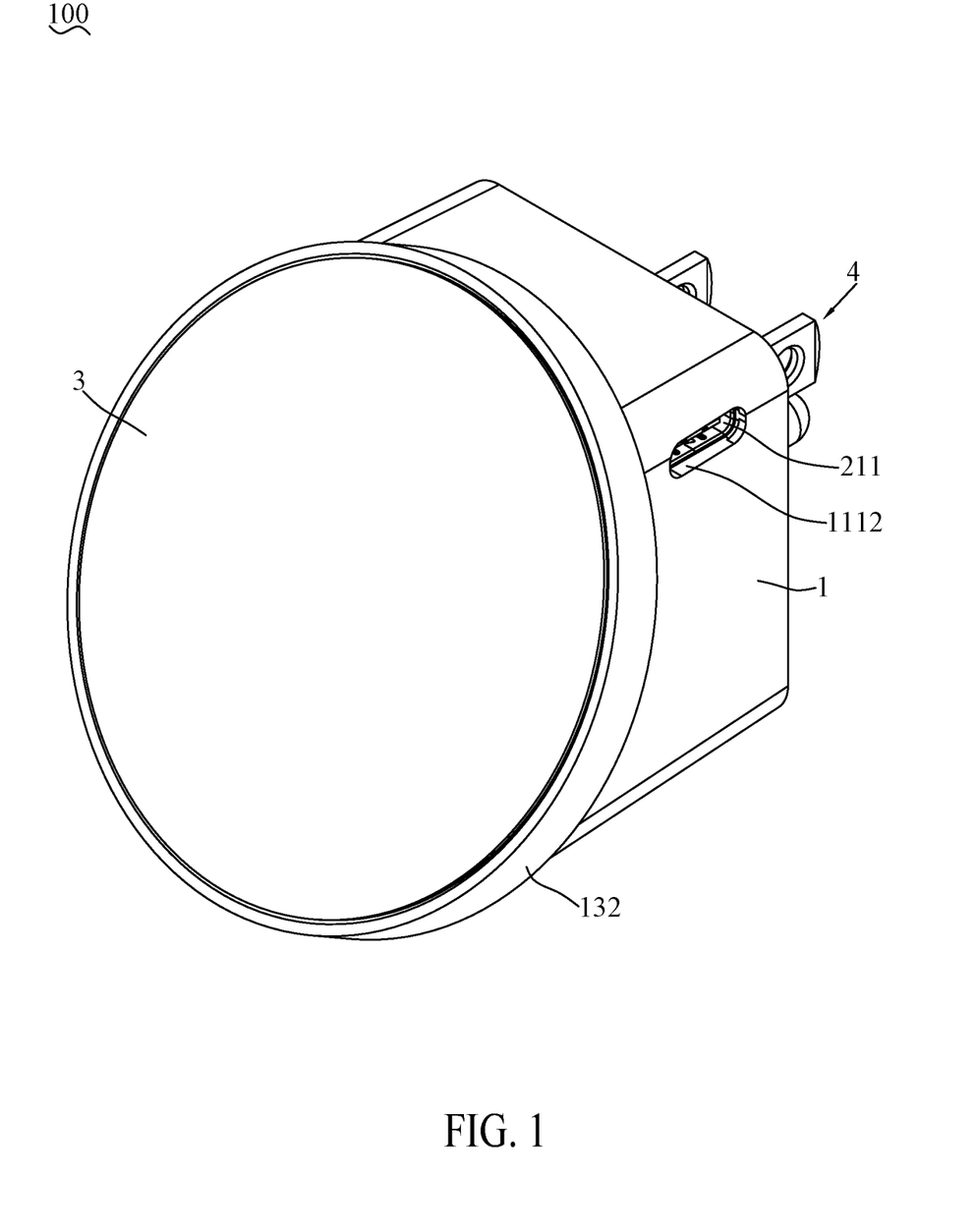
FIG. 1 is a perspective view of a wireless charger with magnetic locating function according to the present invention.
Figure 2:
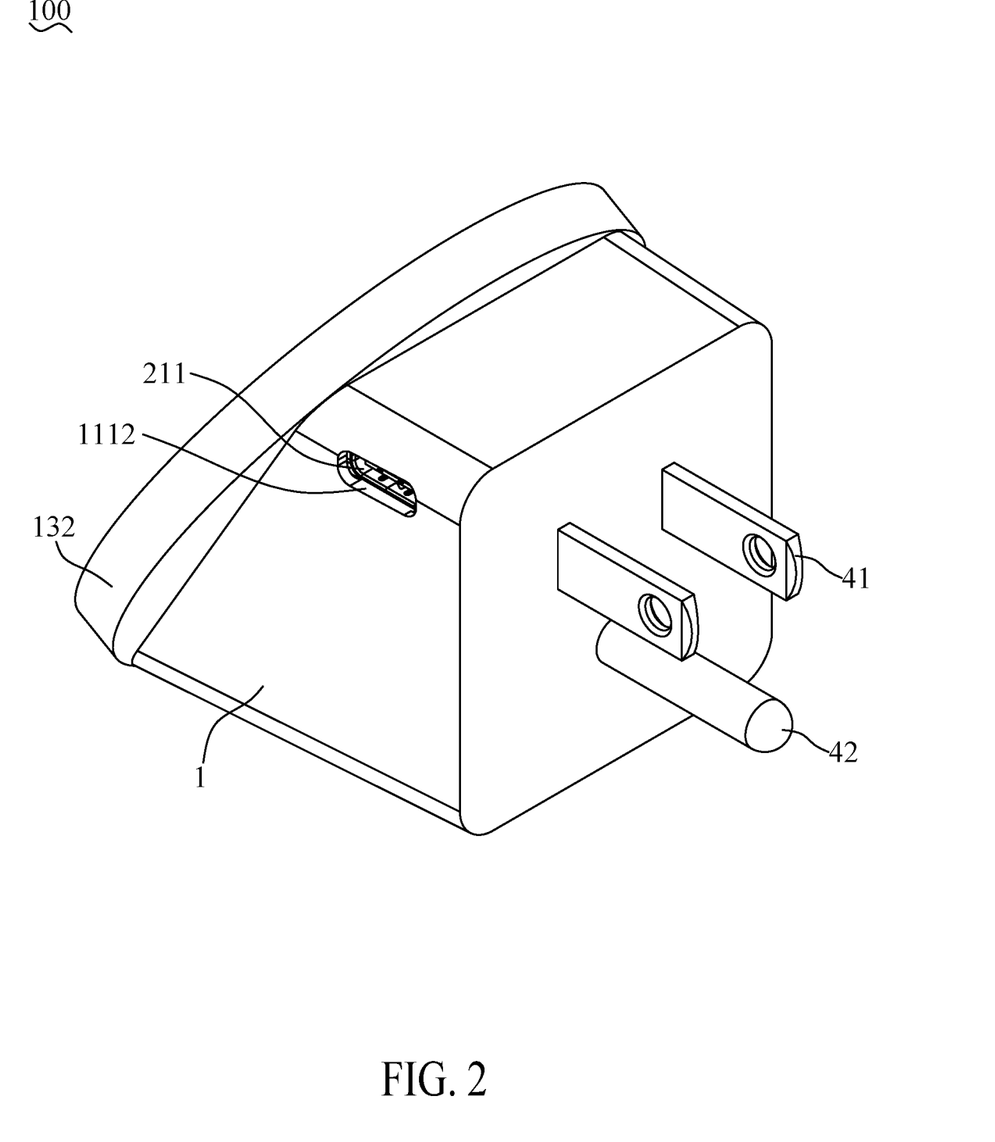
FIG. 2 is another perspective view of the wireless charger with magnetic locating function of FIG. 1.
Figure 3:
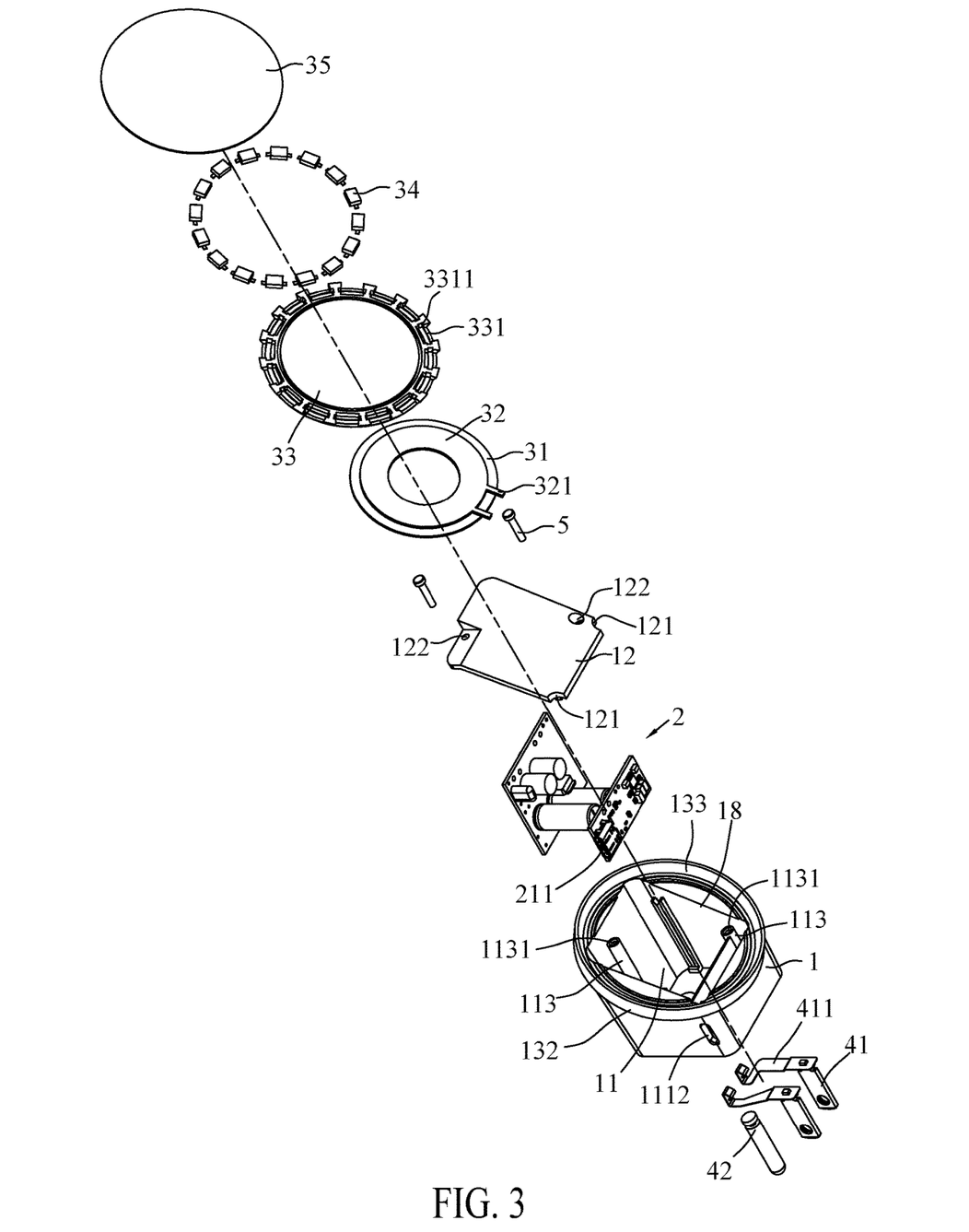
FIG. 3 is an exploded view of the wireless charger with magnetic locating function of FIG. 1.

With reference to FIG. 1 to FIG. 3, a wireless charger with magnetic locating function 100 according to the present invention is shown. The wireless charger with magnetic locating function 100 includes an insulating body 1, a circuit module 2, a wireless charging module 3 and a plug module 4. The wireless charger with magnetic locating function 100 is pluggable.

With reference to FIG. 1 to FIG. 5, a front of the insulating body 1 forms an opening 18. The insulating body 1 has an accommodating space 11 which is formed inside the insulating body 1 and is communicated with the opening 18. The front of the insulating body 1 is recessed inward to form the opening 18, and a middle of a rear of the opening 18 is further recessed inward to form the accommodating space 11. A periphery of the opening 18 is inclined frontward and downward from a top of the insulating body 1 to a bottom of the insulating body 1. The insulating body 1 is equipped with a cover 12. The cover 12 is shown as a rectangular shape. The cover 12 is covered to a front end of the accommodating space 11 of the insulating body 1. The opening 18 is inclined frontward and downward from the top of the insulating body 1 to the bottom of the insulating body 1. The front end of the accommodating space 11 is inclined frontward and downward from the top of the insulating body 1 to the bottom of the insulating body 1. The front end of the accommodating space 11 is connected with the middle of the rear of the opening 18. The cover 12 is assembled in the front end of the accommodating space 11. At least one of the cover 12 and the insulating body 1 has at least one lacking groove 121. The cover 12 of the insulating body 1 has the at least one lacking groove 121. Two opposite ends of a top of the cover 12 are recessed inward to form two lacking grooves 121. A periphery of the front of the insulating body 1 protrudes frontward and extends outward to form a locating portion 132. The locating portion 132 surrounds the opening 18.

Figure 7:
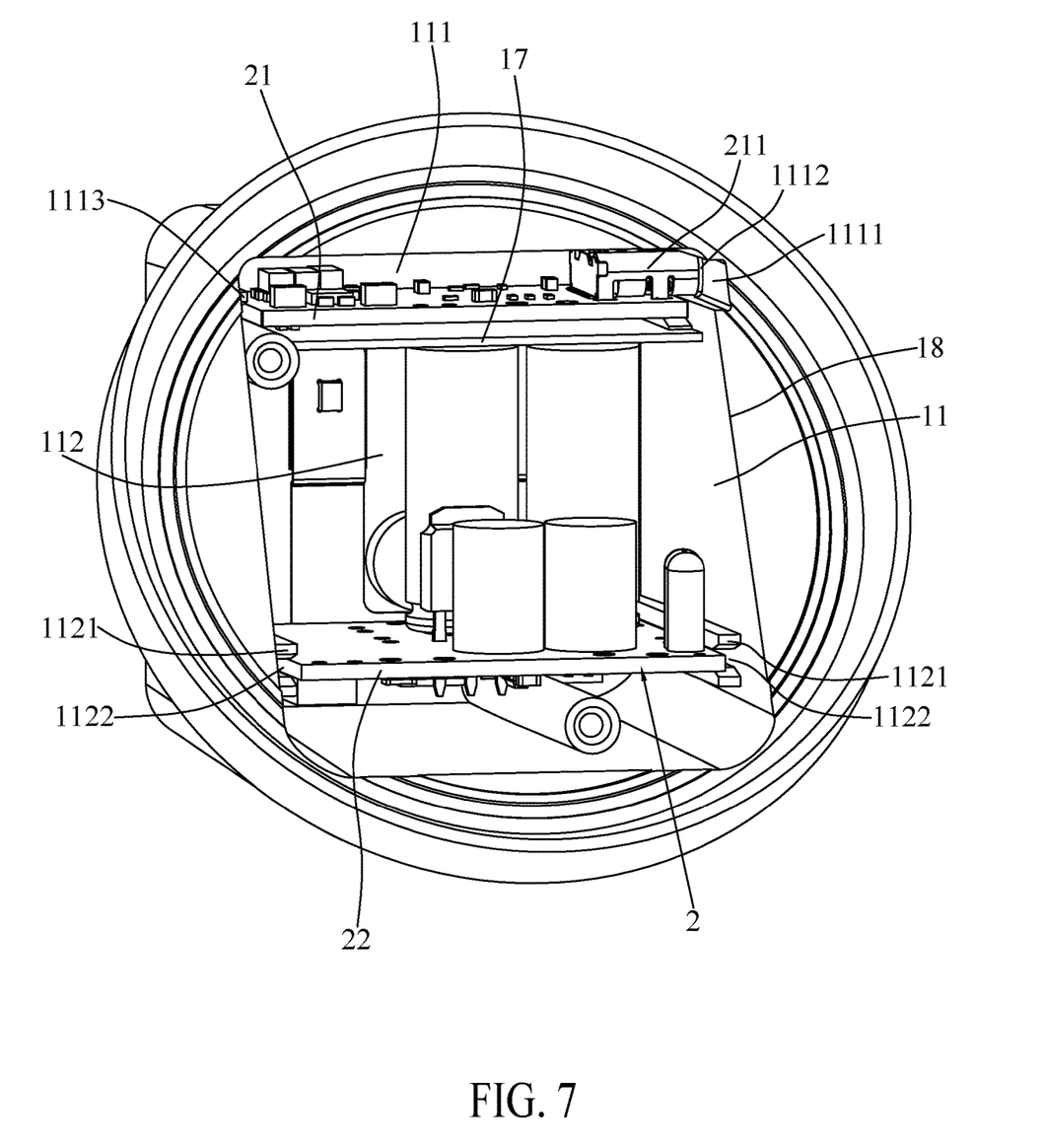
FIG. 7 is another assembled view showing that the insulating body is assembled with a circuit module of the wireless charger with magnetic locating function of FIG. 1.
Figure 8:
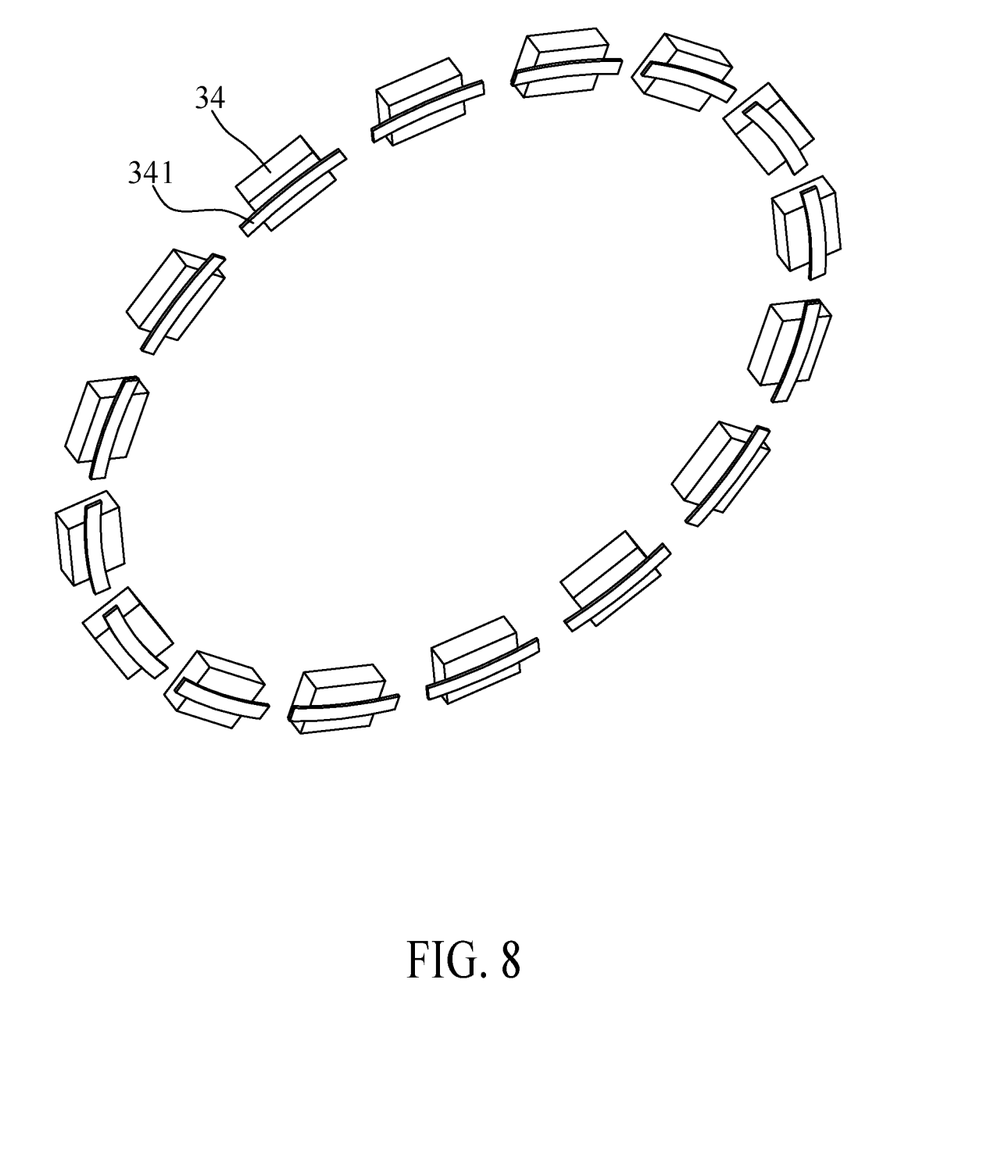
FIG. 8 is a partially perspective view of the wireless charger with magnetic locating function of FIG. 1, wherein a plurality of magnetic elements of the wireless charger with magnetic locating function are arranged in a circular array.

With reference to FIG. 7, the circuit module 2 is mounted in the accommodating space 11.

With reference to FIG. 1 to FIG. 4, the wireless charging module 3 is mounted to the front of the insulating body 1. The wireless charging module 3 is mounted to the opening 18 of the insulating body 1. The cover 12 is assembled between the wireless charging module 3 and the accommodating space 11. The wireless charging module 3 slantwise extends frontward and downward from the top of the insulating body 1 to the bottom of the insulating body 1. The wireless charging module 3 is mounted in the locating portion 132. The wireless charging module 3 includes a magnetic core 31, a charging coil 32, a bracket 33, a plurality of magnetic elements 34 and an outer board 35. A front surface of the magnetic core 31 is equipped with the charging coil 32. Two sides of a top of the charging coil 32 have two terminals 321 extending outward. The two terminals 321 of the charging coil 32 are respectively connected to a positive circuit and a negative circuit of the circuit module 2 through the at least one lacking groove 121. Preferably, the two terminals 321 of the charging coil 32 are respectively connected to the positive circuit and the negative circuit of the circuit module 2 through the two lacking grooves 121 of the cover 12.

The bracket 33 covers the charging coil 32. The bracket 33 is made of plastic. Each magnetic element 34 is mounted to the bracket 33. A periphery of a front of the bracket 33 has a plurality of accommodating grooves 331, and each accommodating groove 331 is equipped with one magnetic element 34. Each magnetic element 34 is used to cooperate with a magnetic component in a smart phone or other electronic devices (not shown). The wireless charger with magnetic locating function 100 attracts the smart phone or the electronic device by an attraction of each magnetic element 34, so that the wireless charger with magnetic locating function 100 proceeds with a wireless charging of the smart phone or other electronic devices. The smart phone or the electronic device is with a wired charging function or a wireless charging function. The smart phone or the electronic device is without the wired charging function or the wireless charging function. The outer board 35 covers the bracket 33.

Figure 4:
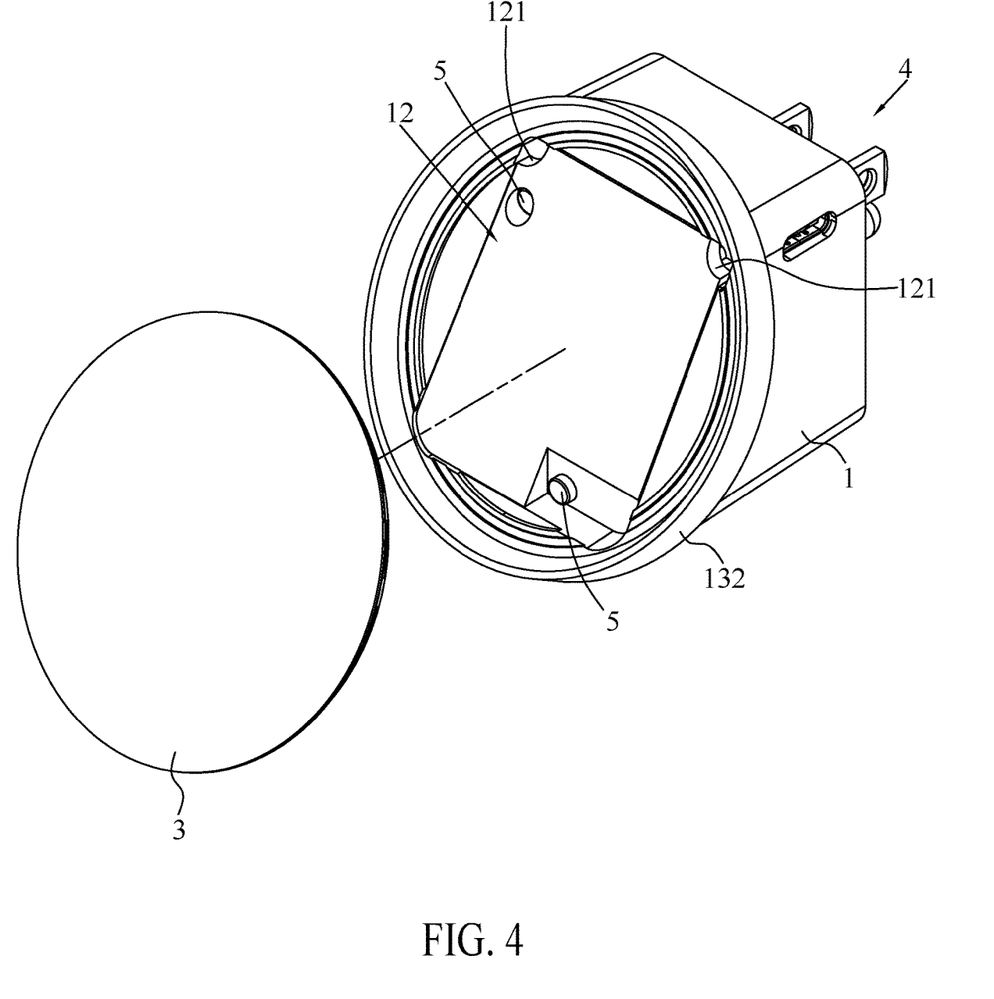
FIG. 4 is a partially exploded view of the wireless charger with magnetic locating function of FIG. 1, wherein a wireless charging module and an insulating body of the wireless charger with magnetic locating function are unassembled.

Referring to FIG. 3 and FIG. 4, the front of the insulating body 1 where the wireless charging module 3 is mounted slantwise extends frontward and downward from the top of the insulating body 1 to the bottom of the insulating body 1, and a front surface of the insulating body 1 is an inclined surface extending frontward and downward from the top of the insulating body 1 to the bottom of the insulating body 1. A front surface 133 of the locating portion 132 is an annular surface. The annular surface extends frontward and downward from a top of the locating portion 132 to a bottom of the locating portion 132.

Figure 5:
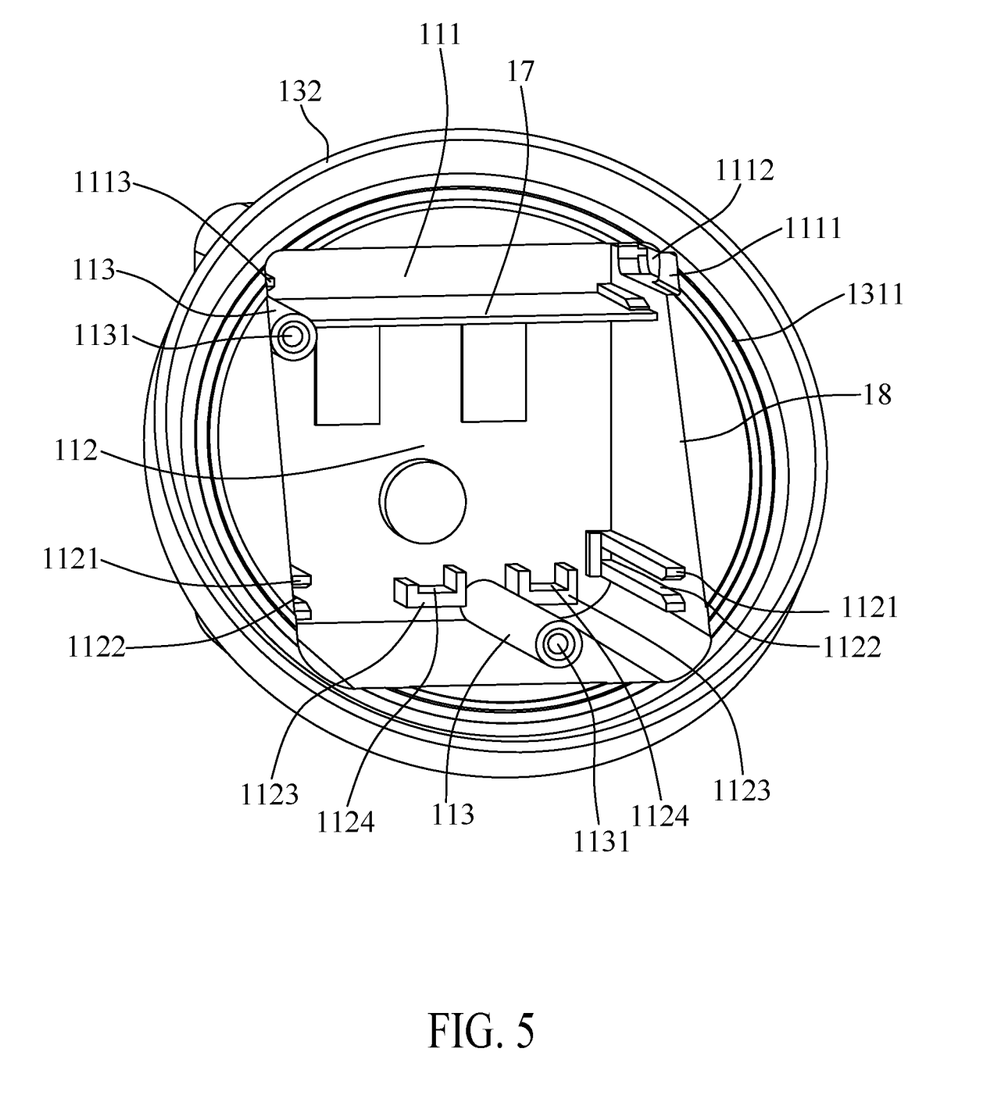
FIG. 5 is a perspective view of the insulating body of the wireless charger with magnetic locating function of FIG. 1.
Figure 6:
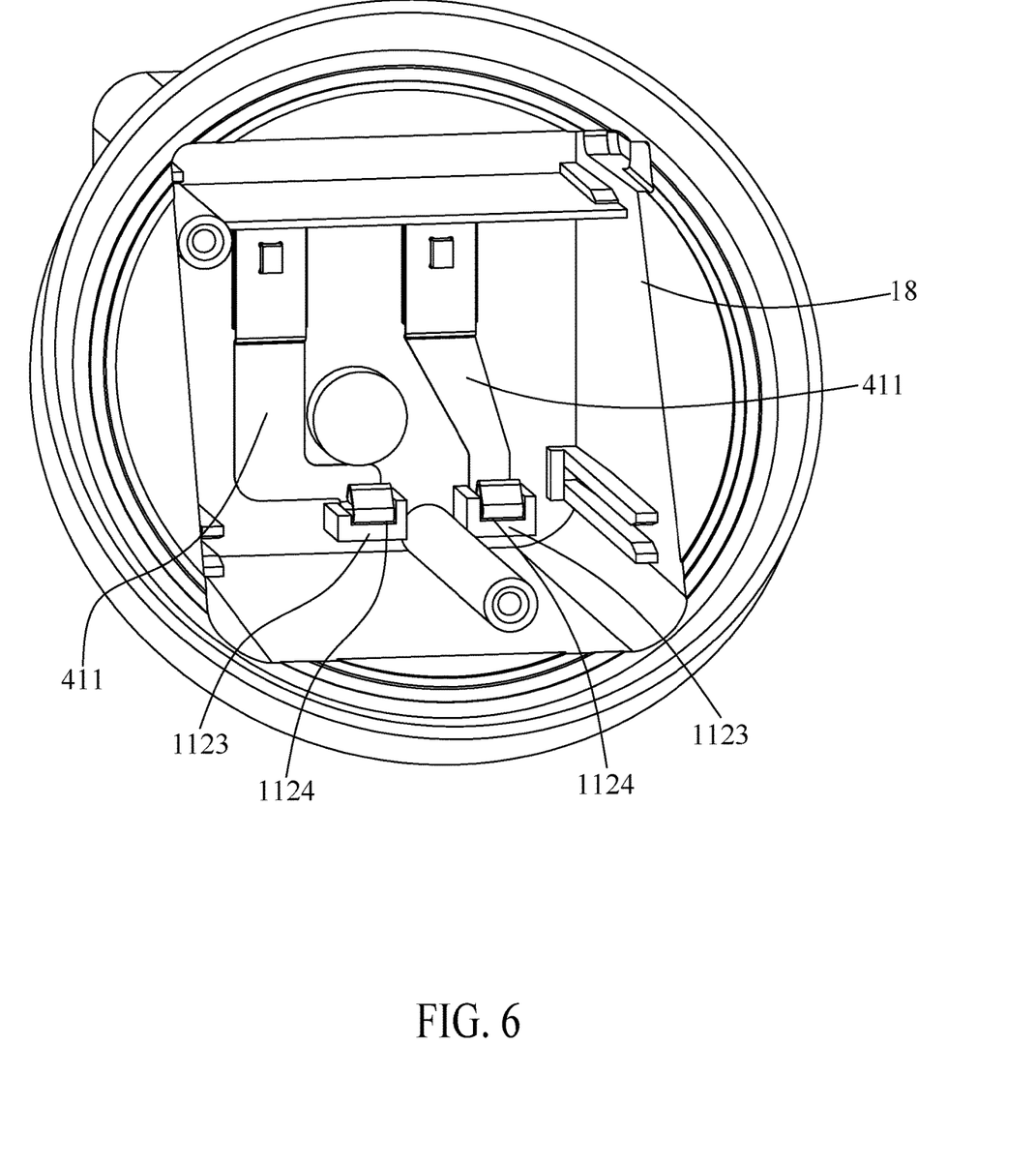
FIG. 6 is an assembled view showing that the insulating body is assembled with a plug module of the wireless charger with magnetic locating function of FIG. 1.

With reference to FIG. 3 to FIG. 5, the insulating body 1 has a ditch 1311 inside the locating portion 132. An inner surface of a rear of the locating portion 132 is recessed inward to form the ditch 1311. The ditch 1311 is in a ring-shaped arrangement, and the ditch 1311 is around a periphery of the inner surface of the rear of the locating portion 132. The ditch 1311 is around the cover 12. When the wireless charger with magnetic locating function 100 is assembled, glue is dispensed in the ditch 1311, the wireless charging module 3 is covered to the ditch 1311, and the wireless charging module 3 is dipped with the glue, so that the wireless charging module 3 is adhered to the ditch 1311, and the wireless charging module 3 is fixed in the locating portion 132.

With reference to FIG. 2 to FIG. 8, the plurality of the accommodating grooves 331 are arranged in a circular array. Middles of inner surfaces of two side walls of each accommodating groove 331 are recessed oppositely to form two restricting slots 3311. Two sides of an inner portion of each magnetic element 34 extend oppositely to form two fixing portions 341. The two fixing portions 341 project beyond two opposite side surfaces of each magnetic element 34. The two fixing portions 341 are disposed corresponding to the two restricting slots 3311. The two fixing portions 341 are restricted in the two restricting slots 3311. So that the plurality of the magnetic elements 34 are fixed in the plurality of the accommodating grooves 331, and the fixing portions 341 of the plurality of the magnetic elements 34 are restricted in the restricting slots 3311 of the plurality of the accommodating grooves 331. Each fixing portion 341 is made of an iron material.

The plurality of the magnetic elements 34 are arranged corresponding to the plurality of the accommodating grooves 331. The plurality of the magnetic elements 34 are arranged in the circular array. The plurality of the magnetic elements 34 are spaced from one another. The plurality of the magnetic elements 34 are disposed around the periphery of the front of the bracket 33. In one situation, two facing polarities of each two adjacent magnetic elements 34 are different. In another situation, polarities of the plurality of the magnetic elements 34 arranged towards the outer board 35 are the same, and polarities of the plurality of the magnetic elements 34 arranged towards the bracket 33 are the same. In another situation, polarities of the outer ring of the plurality of the magnetic elements 34 are the same, and polarities of the inner ring of the plurality of the magnetic elements 34 are the same. When the plurality of the magnetic elements 34 are manufactured, at first, the plurality of the magnetic elements 34 are arranged on a ring-shaped iron element, and the plurality of the magnetic elements 34 are fixed on the ring-shaped iron element, then the ring-shaped iron element is stamped to form the fixing portions 341 of each magnetic element 34, and ring-shaped arrangement positions of the fixing portions 341 of the plurality of the magnetic elements 34 are maintained. At last, the plurality of the magnetic elements 34 are together assembled into the plurality of the accommodating grooves 331, so that manufactures of the plurality of the magnetic elements 34 are completed. The smart phone or the electronic device with the wireless charging function is attracted with the wireless charging module 3 by the plurality of the magnetic elements 34, so that the smart phone or the electronic device is located to the wireless charging module 3, and the smart phone or the electronic device is aligned to the wireless charging module 3.

With reference to FIG. 2 to FIG. 8, the plug module 4 is mounted to a rear of the insulating body 1. The plug module 4 is mounted to a rear of the circuit module 2, and the plug module 4 is connected with the circuit module 2. The plug module 4 projects out of the rear of the insulating body 1 from a rear end of the accommodating space 11. The plug module 4 has two blades 41 and a grounding pin 42. Each blade 41 has a connecting portion 411. Each connecting portion 411 is connected to the circuit module 2.

With reference to FIG. 1 to FIG. 7, one side wall of the accommodating space 11 has a connecting hole 1112 transversely penetrating through the one side wall of the accommodating space 11. The circuit module 2 includes a socket connector 211. The socket connector 211 is corresponding to the connecting hole 1112, and the socket connector 211 is exposed to the connecting hole 1112.

With reference to FIG. 5, the accommodating space 11 of the insulating body 1 is equipped with a partition plate 17 arranged horizontally. The insulating body 1 has an upper accommodating space 111 and a lower accommodating space 112 which are formed inside the insulating body 1 and are communicated with the opening 18. The accommodating space 11 is divided into the upper accommodating space 111 and the lower accommodating space 112 by the partition plate 17. The lower accommodating space 112 is located under the upper accommodating space 111. The one side wall of the upper accommodating space 111 is recessed towards the connecting hole 1112 to form a sliding groove 1111. The sliding groove 1111 is located to one side of the upper accommodating space 111, and the connecting hole 1112 is located to an outer side of the sliding groove 1111. The sliding groove 1111 extends to the opening 18. The sliding groove 1111 is communicated with the opening 18. The sliding groove 1111 is communicated with the connecting hole 1112. An inner surface of the other side of the upper accommodating space 111 protrudes inward to form a limiting rib 1113. Two inner surfaces of two side walls of the lower accommodating space 112 protrude inward to form two elongated limiting protrusions 1121. The two limiting protrusions 1121 are aligned with each other, and the two limiting protrusions 1121 are parallel with each other. An inner surface of a middle of each limiting protrusion 1121 is recessed inward to form a fastening groove 1122. Two sides of an inner surface of a rear wall of the lower accommodating space 112 protrude frontward to form two blocking portions 1123. A middle of a top surface of each blocking portion 1123 is recessed downward to form a locating groove 1124.

With reference to FIG. 3 to FIG. 9, the circuit module 2 includes a first circuit board 21 and a second circuit board 22. The plug module 4 is connected with the second circuit board 22. The charging coil 32 is connected to the second circuit board 22. The first circuit board 21 and the second circuit board 22 are connected to each other by a connecting cable (not shown). The first circuit board 21 is disposed in the upper accommodating space 111. The first circuit board 21 has the socket connector 211. The socket connector 211 is mounted on a top surface of one side of the first circuit board 21. The socket connector 211 is exposed out of the insulating body 1. When the first circuit board 21 is assembled to the upper accommodating space 111, an outer side of the socket connector 211 moves inwardly to the connecting hole 1112 along the sliding groove 1111. The first circuit board 21 is positioned to the partition plate 17. The other side of the first circuit board 21 is placed between the limiting rib 1113 and the partition plate 17, so that the first circuit board 21 is assembled in the upper accommodating space 111.

Figure 9:
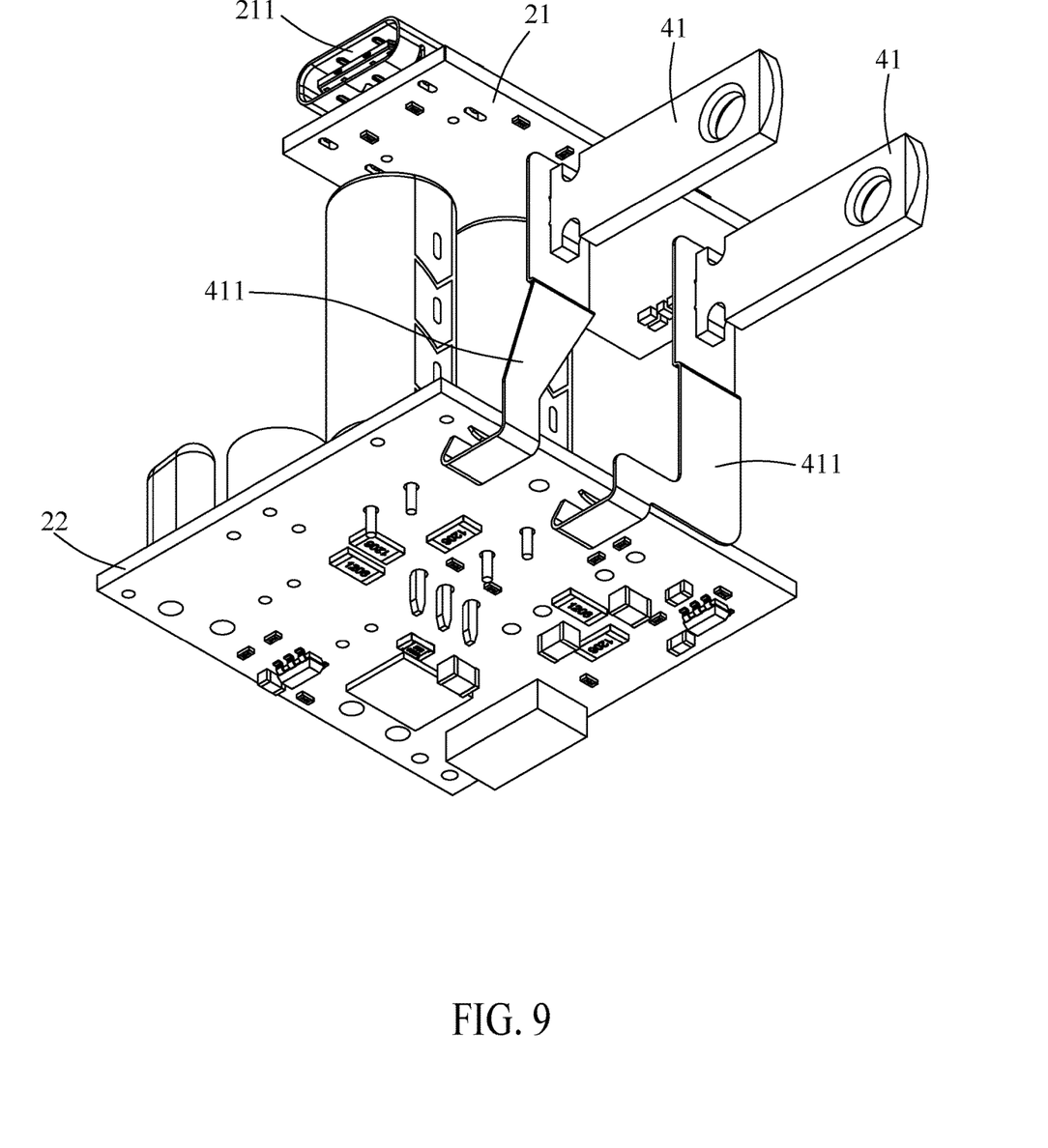
FIG. 9 is another partially perspective view of the wireless charger with magnetic locating function of FIG. 1, wherein the circuit module and the plug module of the wireless charger with magnetic locating function are assembled.
Figure 10:
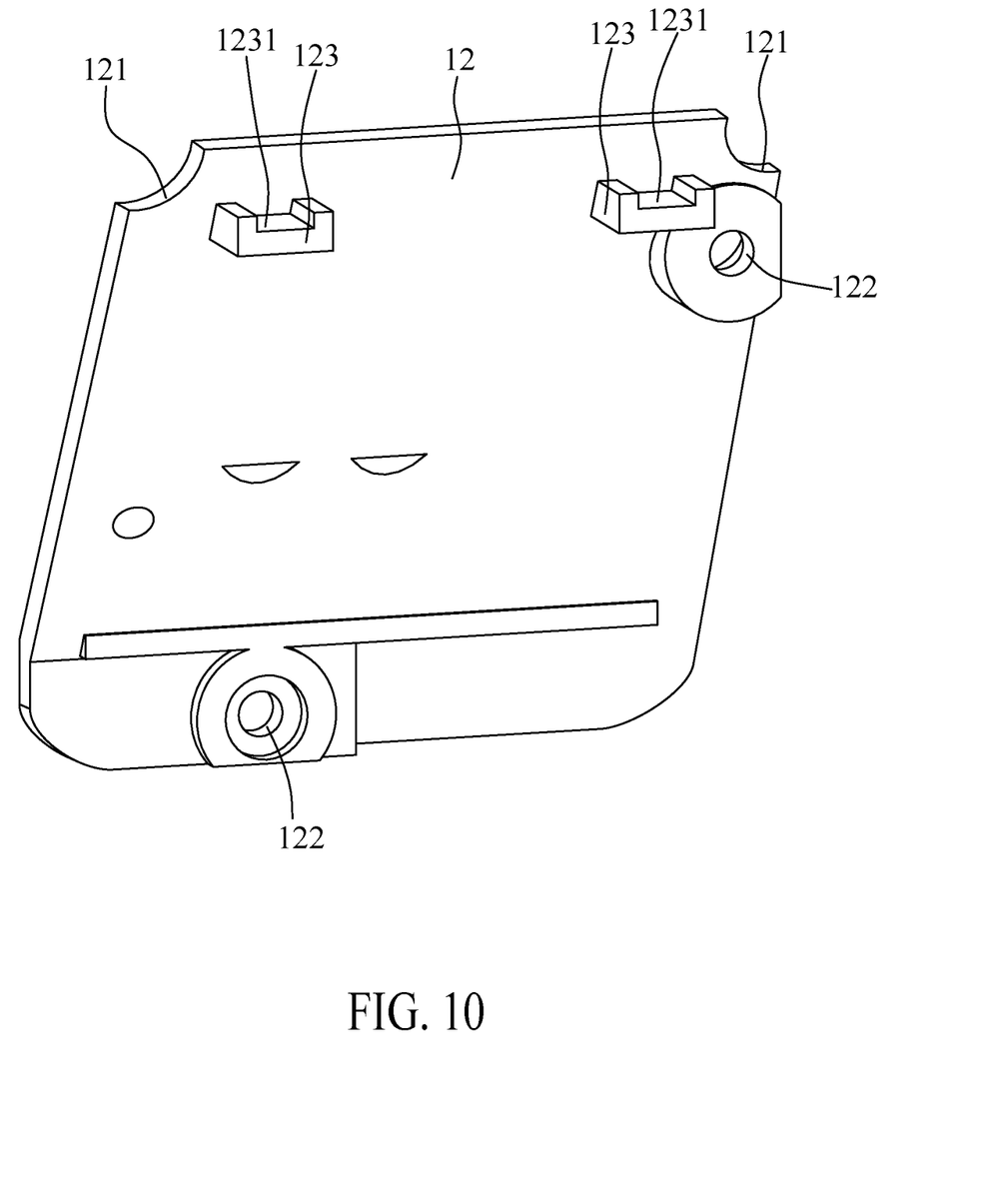
FIG. 10 is a perspective view of a cover of the wireless charger with magnetic locating function of FIG. 1.

With reference to FIG. 3 and FIG. 9, the first circuit board 21 has the negative circuit and the positive circuit. The two terminals 321 of the charging coil 32 are respectively connected to the positive circuit and negative circuit of the first circuit board 21.

Figure 11:
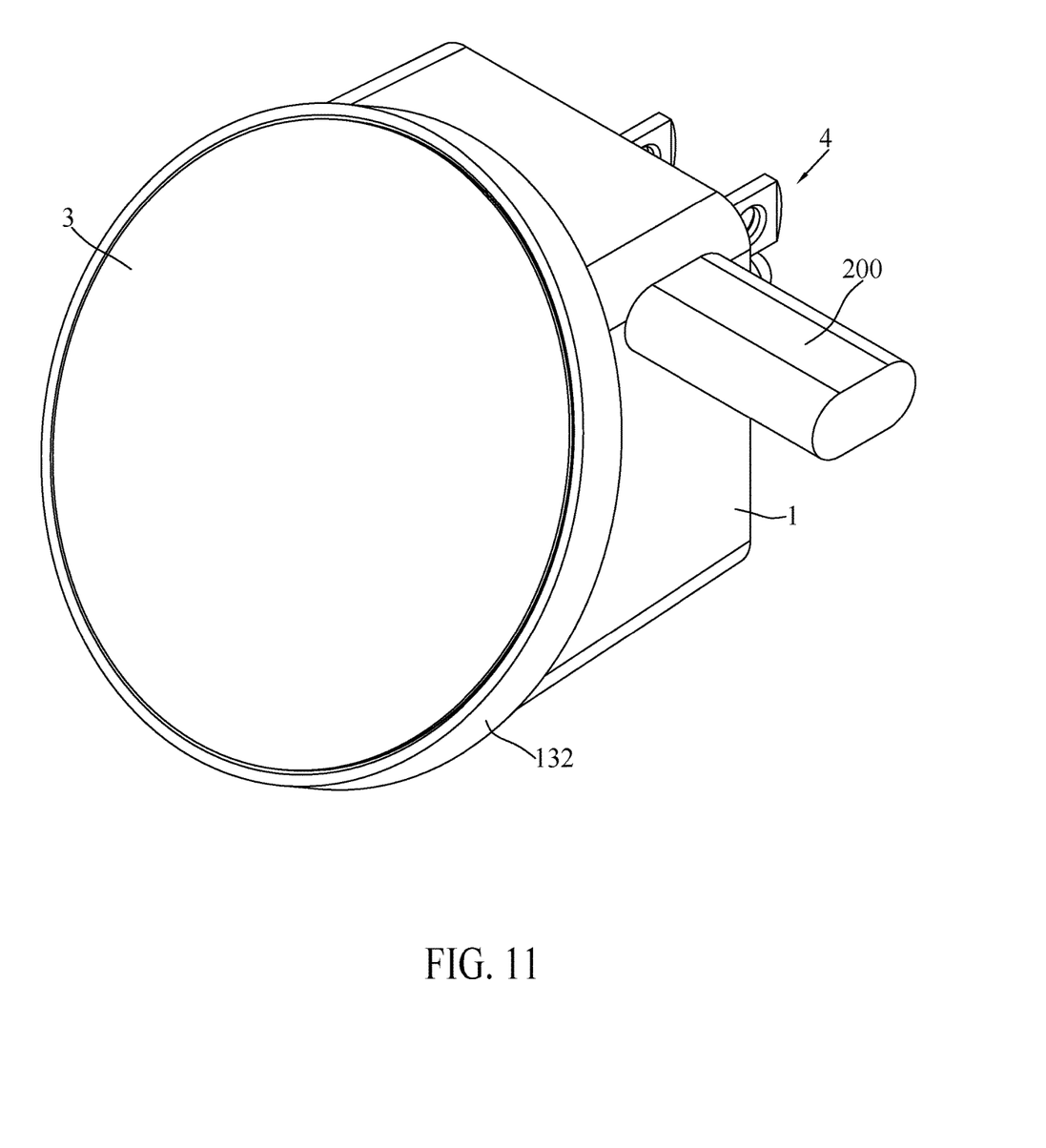
FIG. 11 is a combination view showing that an external connector is connected to the wireless charger with magnetic locating function of FIG. 1.

With reference to FIG. 1 and FIG. 11, the socket connector 211 is connected to an external connector 200 to proceed with the wired charging function. Specifically, the socket connector 211 is a USB (Universal Serial Bus) Type C socket connector.

With reference to FIG. 7, the second circuit board 22 is disposed in the lower accommodating space 112. Specifically, two opposite sides of the second circuit board 22 are assembled into the two fastening grooves 1122 of the two limiting protrusions 1121, so that the second circuit board 22 is fastened in the lower accommodating space 112. The second circuit board 22 is connected to the first circuit board 21.

The first circuit board 21 and the second circuit board 22 mentioned here are designed into a two-piece pattern according to a design of the accommodating space 111. Each of the first circuit board 21 and the second circuit board 22 is equipped with some parts of a complete circuit board of the circuit module 2. The first circuit board 21 and the second circuit board 22 are connected to each other. The first circuit board 21 and the second circuit board 22 cooperate with each other to realize a function of the complete circuit board of the circuit module 2, so that the first circuit board 21 and the second circuit board 22 are regarded as the complete circuit board.

With reference to FIG. 4 to FIG. 7, each connecting portion 411 of the plug module 4 is partially located in the locating groove 1124, so that a position of each connecting portion 411 of the plug module 4 is fastened. The connecting portion 411 is connected to the second circuit board 22.

With reference to FIG. 2 to FIG. 5, the inner surface of the rear wall of the accommodating space 11 protrudes frontward to form a fastening portion 113. Preferably, an upper portion and a lower portion of the inner surface of the rear wall of the accommodating space 11 protrude frontward to form two fastening portions 113. A middle of a front surface of each fastening portion 113 is recessed inward to form a first fixing hole 1131. The cover 12 has a second fixing hole 122. Preferably, an upper portion and a lower portion of the cover 12 define two second fixing holes 122. Each second fixing hole 122 is corresponding to one first fixing hole 1131. The wireless charger with magnetic locating function 100 includes a plurality of fixing elements 5. Each fixing element 5 passes through the one first fixing hole 1131 and one second fixing hole 122, so the cover 12 is fastened to the opening 18 of the accommodating space 11.

With reference to FIG. 3, FIG. 5, FIG. 7 and FIG. 10, an upper portion of a rear surface of the cover 12 protrudes rearward to form at least one abutting block 123. Preferably, two sides of the upper portion of the rear surface of the cover 12 protrude rearward to form two abutting blocks 123. When the cover 12 is fixed to the opening 18 of the accommodating space 11, each abutting block 123 abuts against a front end of the first circuit board 21, so that the first circuit board 21 is stably accommodated in the upper accommodating space 111. A middle of a top surface of each abutting block 123 is recessed downward to form an indentation 1231, and the indentation 1231 strengthens a structural strength of each abutting block 123.

Referring to FIG. 1 to FIG. 11, when a user uses the wireless charger with magnetic locating function 100, the plug module 4 is inserted into a receptacle connector of a power supply, current enters the circuit module 2 along the plug module 4. When the user places the smart phone or the electronic device with the wireless charging function on the outer board 35 of the wireless charging module 3, the magnetic component which is mounted in the smart phone or the electronic device with the wireless charging function will be attracted with the plurality of the magnetic elements 34 of the wireless charging module 3, so that the smart phone or the electronic device with the wireless charging function is attached to the outer board 35 of the wireless charging module 3, and the smart phone or the electronic device with the wireless charging function is aligned to the outer board 35 of the wireless charging module 3.

At the same time, the current flows from the circuit module 2 to the charging coil 32 through the two terminals 321. The current flowing in the charging coil 32 generates a magnetic field, a conductive coil in the smart phone or the electronic device with the wireless charging function generates an electromagnetic induction phenomenon in the magnetic field to proceed with a wireless charging of the smart phone or the electronic device. When the smart phone or the electronic device with the wireless charging function is fully charged, or when the user wants to interrupt the wireless charging to use the smart phone or the electronic device with the wireless charging function, the user directly picks up the smart phone or the electronic device with the wireless charging function which is attached to the outer board 35 of the wireless charging module 3 to interrupt the wireless charging for use. When the user wants to use the wired charging function, a charging cable with the external connector 200 is inserted into the socket connector 211 to perform the wired charging function. The external connector 200 is a USB Type C plug connector.

In order to improve a charging efficiency, the wireless charger with magnetic locating function 100 simultaneously use the wireless charging module 3 and the socket connector 211 for charging, that is to say, the user uses the wireless charging module 3 to wirelessly charge one smart phone or one electronic device with the wireless charging function, and at the same time, the user uses the socket connector 211 to proceed with a wired charging of another smart phone or another electronic device with the wired charging function. Sometimes, it is possible to place the smart phone or the electronic device on the wireless charging module 3 for the wireless charging, and the charging cable is used to connect the socket connector 211 and the smart phone or the electronic device to perform the wired charging at the same time.

The cover 12 is slantwise disposed frontward and downward from the top of the cover 12 to a bottom of the cover 12. The cover 12 has an inclination angle along with the opening 18 of the accommodating space 11. The wireless charger with magnetic locating function 100 is a plug type. The plurality of the magnetic elements 34 have a magnetic locating function. When the wireless charger with magnetic locating function 100 is inserted into a wall socket directly, the smart phone or the electronic device with the wireless charging function is able to be placed on the wireless charging module 3 directly to be charged at any time. When the wireless charger with magnetic locating function 100 is inserted into a desktop socket directly, the cover 12 with the inclination angle forms a holder conforming to an ergonomics, the smart phone or the electronic device with the wireless charging function is able to be placed on the wireless charging module 3, thus, in a process of proceeding with the wireless charging of the smart phone or the electronic device by the user, the user is able to see a displayed condition on a screen of the smart phone or the electronic device with the wireless charging function at the time of the user performing the wireless charging on the wireless charging module 3.

As described above, the wireless charger with magnetic locating function 100 integrates the plug module 4 with the wireless charging module 3, so the wireless charger with magnetic locating function 100 realizes a wireless charging function. The smart phone or the electronic device with the wireless charging function is located on the wireless charging module 3 by the plurality of the magnetic elements 34, so that the smart phone or the electronic device on the wireless charging module 3 is aligned with the charging coil 32. As a result, it is convenient for the user to wirelessly charge the smart phone or the electronic device with the wireless charging function.

What is claimed is:

1. A wireless charger with magnetic locating function, comprising:
    an insulating body, a front of the insulating body being recessed inward to form an opening, and the opening being further recessed inward to form an accommodating space;
    a circuit module mounted in the accommodating space;
    a plug module mounted to a rear of the circuit module, and the plug module being connected with the circuit module, the plug module projecting out of the insulating body from a rear end of the accommodating space; and
    a wireless charging module mounted to the opening of the insulating body, the wireless charging module slantwise extending frontward and downward from a top of the insulating body to a bottom of the insulating body, the wireless charging module including a magnetic core, a charging coil, a bracket, a plurality of magnetic elements and an outer board, the magnetic core being equipped with the charging coil, the charging coil being connected to the circuit module, the bracket covering the charging coil, a periphery of a front of the bracket having a plurality of accommodating grooves, and each accommodating groove being equipped with one magnetic element, the outer board covering the bracket;
    wherein the accommodating space of the insulating body is equipped with a partition plate arranged horizontally, the accommodating space is divided into an upper accommodating space and a lower accommodating space by the partition plate, the circuit module includes a first circuit board and a second circuit board, the first circuit board and the second circuit board are connected to each other, the first circuit board is disposed in the upper accommodating space, and the second circuit board is disposed in the lower accommodating space.

2. The wireless charger with magnetic locating function as claimed in claim 1, wherein one side wall of the accommodating space has a connecting hole transversely penetrating through the one side wall of the accommodating space, the circuit module includes a socket connector, the socket connector is corresponding to the connecting hole, and the socket connector is exposed to the connecting hole.

3. The wireless charger with magnetic locating function as claimed in claim 1, wherein the front of the insulating body where the wireless charging module is mounted slantwise extends frontward and downward from the top of the insulating body to the bottom of the insulating body, and a front surface of the insulating body is an inclined surface extending frontward and downward from the top of the insulating body to the bottom of the insulating body.

4. The wireless charger with magnetic locating function as claimed in claim 1, further comprising a cover, the opening being inclined frontward and downward from the top of the insulating body to the bottom of the insulating body, a front end of the accommodating space being inclined frontward and downward from the top of the insulating body to the bottom of the insulating body, the front end of the accommodating space being connected with a middle of a rear of the opening, the cover being assembled in the front end of the accommodating space, at least one of the cover and the insulating body having at least one lacking groove, two sides of a top of the charging coil having two terminals extending outward, the two terminals being respectively connected to the circuit module through the at least one lacking groove.

5. The wireless charger with magnetic locating function as claimed in claim 1, wherein a periphery of the front of the insulating body protrudes frontward and extends outward to form a locating portion, the wireless charging module is mounted in the locating portion.

6. The wireless charger with magnetic locating function as claimed in claim 1, wherein the first circuit board has a socket connector, the plug module has two blades and a grounding pin, each blade has a connecting portion, the connecting portion is connected to the second circuit board.

7. The wireless charger with magnetic locating function as claimed in claim 1, wherein two inner surfaces of two side walls of the lower accommodating space protrude inward to form two limiting protrusions, an inner surface of a middle of each limiting protrusion is recessed inward to form a fastening groove, two opposite sides of the second circuit board are assembled into the two fastening grooves of the two limiting protrusions.

8. The wireless charger with magnetic locating function as claimed in claim 7, wherein the two limiting protrusions are aligned with each other, and the two limiting protrusions are parallel with each other.

9. The wireless charger with magnetic locating function as claimed in claim 1, wherein the plurality of the accommodating grooves are arranged in a circular array, the plurality of the magnetic elements are arranged in the circular array.

10. A wireless charger with magnetic locating function, comprising:
    an insulating body, a front of the insulating body being recessed inward to form an opening, and the opening being further recessed inward to form an accommodating space;
    a circuit module mounted in the accommodating space;
    a plug module mounted to a rear of the circuit module, and the plug module being connected with the circuit module, the plug module projecting out of the insulating body from a rear end of the accommodating space; and
    a wireless charging module mounted to the opening of the insulating body, the wireless charging module slantwise extending frontward and downward from a top of the insulating body to a bottom of the insulating body, the wireless charging module including a magnetic core, a charging coil, a bracket, a plurality of magnetic elements and an outer board, the magnetic core being equipped with the charging coil, the charging coil being connected to the circuit module, the bracket covering the charging coil, a periphery of a front of the bracket having a plurality of accommodating grooves, and each accommodating groove being equipped with one magnetic element, the outer board covering the bracket;
    wherein middles of inner surfaces of two side walls of each accommodating groove are recessed oppositely to form two restricting slots, two sides of an inner portion of each magnetic element extend oppositely to form two fixing portions, the two fixing portions project beyond two opposite side surfaces of each magnetic element, the two fixing portions are disposed correspondingly to the two restricting slots, and the two fixing portions are restricted in the two restricting slots.

* * * * *